(12) United States Patent
Meurer et al.

(10) Patent No.: US 8,444,873 B2
(45) Date of Patent: May 21, 2013

(54) REFRIGERANT COMPOSITION

(75) Inventors: Christoph Meurer, Hannover (DE);
Felix Flohr, Hildesheim (DE); Helge Rau, Burgdorf (DE)

(73) Assignee: Solvay Fluor GmbH, Hannover (DE)

( * ) Notice: Subject to any disclaimer, the term of this patent is extended or adjusted under 35 U.S.C. 154(b) by 372 days.

(21) Appl. No.: 12/792,300

(22) Filed: Jun. 2, 2010

(65) Prior Publication Data

US 2010/0314574 A1 Dec. 16, 2010

(30) Foreign Application Priority Data

Jun. 12, 2009 (EP) .................................. 09162579

(51) Int. Cl.
*C09K 5/04* (2006.01)
*F25B 23/00* (2006.01)

(52) U.S. Cl.
USPC .................. 252/67; 252/68; 62/467

(58) Field of Classification Search
USPC ......................... 252/67, 68; 62/467
See application file for complete search history.

(56) References Cited

U.S. PATENT DOCUMENTS

| | | | |
|---|---|---|---|
| 2,885,427 A | 5/1959 | Ruh et al. | |
| 3,819,493 A | 6/1974 | Fozzard | |
| 4,482,465 A | 11/1984 | Gray | |
| 5,066,410 A | 11/1991 | Omure et al. | |
| 5,135,054 A | 8/1992 | Nimitz et al. | |
| 5,370,811 A | 12/1994 | Yoshida et al. | |
| 5,425,890 A | 6/1995 | Yudin et al. | |
| 5,527,573 A | 6/1996 | Park et al. | |
| 5,622,644 A | 4/1997 | Stevenson et al. | |
| 5,688,432 A | 11/1997 | Pearson | |
| 5,869,546 A | 2/1999 | Gruss et al. | |
| 6,428,720 B1 | 8/2002 | Roberts | |
| 6,508,950 B1 | 1/2003 | Lim et al. | |
| 6,526,764 B1 | 3/2003 | Singh et al. | |
| 6,629,419 B1 | 10/2003 | Powell et al. | |
| 6,695,973 B1 * | 2/2004 | Musso et al. | 252/67 |
| 6,863,840 B2 * | 3/2005 | Goble | 252/67 |
| 6,910,337 B2 | 6/2005 | Flohr et al. | |
| 7,229,567 B2 * | 6/2007 | Roberts | 252/68 |
| RE42,652 E | 8/2011 | Musso et al. | |
| 8,246,851 B2 * | 8/2012 | Roberts et al. | 252/68 |
| 2001/0017364 A1 | 8/2001 | Takemasa | |
| 2002/0096657 A1 * | 7/2002 | Roberts | 252/67 |
| 2003/0062508 A1 | 4/2003 | Singh et al. | |
| 2004/0026655 A1 | 2/2004 | Poole et al. | |
| 2004/0069970 A1 | 4/2004 | Goble | |
| 2006/0191665 A1 | 8/2006 | Ponder et al. | |
| 2007/0290163 A1 | 12/2007 | Poole et al. | |
| 2008/0128650 A1 * | 6/2008 | Roberts et al. | 252/67 |
| 2012/0240602 A1 * | 9/2012 | Ponder et al. | 62/77 |

FOREIGN PATENT DOCUMENTS

| | | |
|---|---|---|
| CN | 1236001 A | 11/1999 |
| CN | 101045856 A | 10/2007 |
| DE | 4226431 A1 | 2/1994 |
| EP | 0504112 A2 | 9/1992 |
| EP | 0536940 B1 | 4/1993 |
| EP | 0539952 A1 | 5/1993 |
| EP | 0720639 B1 | 7/1996 |
| EP | 0451692 B1 | 9/1996 |
| EP | 0759042 B1 | 2/1997 |
| EP | 0772659 B1 | 5/1997 |
| EP | 0779352 A1 | 6/1997 |
| EP | 1216284 B1 | 6/2002 |
| GB | 2247462 A | 3/1992 |
| JP | 63308085 A | 12/1988 |
| JP | 1108291 A | 4/1989 |
| JP | 1139675 A | 6/1989 |
| JP | 1139678 A | 6/1989 |
| JP | 3170585 A | 7/1991 |
| JP | 3205491 A | 9/1991 |
| JP | 3276052 A | 12/1991 |
| JP | 3285997 A | 12/1991 |
| JP | 3287688 A | 12/1991 |
| JP | 7173462 A | 7/1995 |
| JP | 8104769 A | 4/1996 |
| JP | 8170074 A | 7/1996 |
| JP | 8170075 A | 7/1996 |
| JP | 8319479 A | 12/1996 |
| JP | 9025480 A | 1/1997 |
| JP | 9176625 A | 7/1997 |
| JP | 9221664 A | 8/1997 |
| JP | 2004175998 A | 6/2004 |
| RU | 2072382 C1 | 1/1997 |
| WO | WO 9201762 A1 | 2/1992 |
| WO | WO 9208520 A1 | 5/1992 |
| WO | WO 9214444 A1 | 9/1992 |
| WO | WO 9301152 A2 | 1/1993 |
| WO | WO 9315163 A1 | 8/1993 |

(Continued)

OTHER PUBLICATIONS

Dalby, Richard N.—"Safety Assessment of Metered Dose Inhalers Containing Flammable Propellants", Journal of Biopharmaceutical Sciences, 1992, 3, 1, pp. 49-57; 9 pgs.
E. I. Du Pont De Nemours & Co., Inc—"Fluorocarbon Azeotropes", Research Disclosure vol. 162, Oct. 1977, Disclosure # 16265, pp. 70-71; 3 pgs.
Butler D.—"R22 drop-in a success at BRE", Refrigeration and Air Conditioning 1994, 97, pp. 49-50; 2 pgs.
Pearson, S. Forbes—"Uses of Hydrocarbon Refrigerants", IIF-IIR Commissions B1, B2, E1 & E2, 1996, pp. 439-446; 8 pgs.
Roberts, N. A., et al—"High Efficency R22 Replacement", Purdue Conference Proceedings, 1996; 7 pgs.
Roberts, N. A.—"Determination of the Performance, Leak Scenario, Flammability and Oil Return Characteristics of a Novel R22 Replacement", 1998, Proceedings of the 1998 International Refrigeration Conference at Purdue, pp. 25-30; 7 pgs.

*Primary Examiner* — Douglas McGinty
(74) *Attorney, Agent, or Firm* — Beatrice C. Ortego

(57) ABSTRACT

A composition which comprises or consists of more than 75 to less than 80 wt. % of pentafluoroethane (HFC-125); more than 17 to less than 22.7 wt. % of 1,1,1,2-tetrafluoroethane (HFC-134a); and more than 2.3 to less than 3.0 wt. % of n-butane (R600).

19 Claims, No Drawings

FOREIGN PATENT DOCUMENTS

| | | | |
|---|---|---|---|
| WO | WO 9413460 A1 | 6/1994 |
| WO | WO 9418282 A1 | 8/1994 |
| WO | WO 9426835 A1 | 11/1994 |
| WO | WO 9524451 A1 | 9/1995 |
| WO | WO 9711138 A1 | 3/1997 |
| WO | WO 9715637 A1 | 5/1997 |
| WO | WO 9903947 A1 | 1/1999 |
| WO | WO 0056834 A1 | 9/2000 |
| WO | WO 0123493 A1 * | 4/2001 |
| WO | WO 0140400 A1 | 6/2001 |
| WO | WO 2004033582 A1 | 4/2004 |
| WO | WO 2004050787 A1 | 6/2004 |
| WO | WO 2005049759 A1 | 6/2005 |
| WO | WO 2005083028 A1 | 9/2005 |
| WO | WO 2006084262 A1 | 8/2006 |
| WO | WO 2006094303 A1 | 9/2006 |
| WO | WO 2006124776 A2 | 11/2006 |
| WO | WO 2007099351 A1 | 9/2007 |
| WO | WO 2007143051 A2 | 12/2007 |
| WO | WO 2008033568 A2 | 3/2008 |
| WO | WO 2008053170 A1 | 5/2008 |
| WO | WO 2008059199 A1 | 5/2008 |
| WO | WO 2008065331 A2 | 6/2008 |
| WO | WO 2008079226 A1 | 7/2008 |
| WO | WO 2009129126 A1 | 10/2009 |

* cited by examiner

REFRIGERANT COMPOSITION

CROSS-REFERENCE TO RELATED APPLICATIONS

The present application claims the priority benefit under 35 U.S.C. §119(a)-(d) of European Application No. 09162579.8 filed Jun. 12, 2009, the whole content of this application being incorporated herein by reference for all purposes.

FIELD OF THE INVENTION

The present invention relates to refrigerant compositions, which are suitable, in particular as replacement or drop-in substitute for chlorodifluoromethane (HCFC-22).

BACKGROUND OF THE INVENTION

HCFC-22 is due to be phased out in certain countries for cooling and air conditioning applications to address Ozone Depletion Potential concerns related to that compound. Different replacement compositions for HCFC-22 (also known as R22) have been suggested, for example R417A which consists of 46.6 wt. % pentafluoroethane (HFC-125), 50 wt. % 1,1,1,2-tetrafluoroethane (HFC-134a) and 3.4 wt. % n-butane (R-600).

A specific field of application of HCFC-22 is low temperature refrigeration.

WO-A-01/23493 discloses a refrigerant composition comprising HFC-125, HFC-134a and an additive selected from a saturated hydrocarbon or a mixture thereof boiling in the range of −5 to 70° C. wherein the weights of HFC-125 to R134a is in the ranges 50-80 wt. % HFC-125, 50-20% wt % HFC-134a.

WO-A-2004/033582 discloses in particular compositions consisting of 85 wt. % HFC-125, 11.5 wt. % HFC-134a and 3.5 wt. % of n-butane or isobutane.

SUMMARY OF THE INVENTION

The invention makes now available refrigerant compositions having zero ozone depletion potential, which are suitable as HCFC-22 drop-in substitutes, especially for low-temperature refrigeration applications, and present advantages in particular regarding their volumetric cooling capacity. Also, generally, the refrigerant compositions found are and remain non-flammable in case of a worst case fractionation scenario.

The invention relates in consequence to a composition which comprises or consists of
HFC-125: more than 75 to less than 80 wt. %
HFC-134a: more than 17 to less than 22.7 wt. %
R600: more than 2.3 to less than 3.0 wt. %.

The percentages herein are relative to the total weight of the composition.

It has been found, surprisingly, that the composition according to the invention when used to replace R22 in existing refrigeration systems offer good oil return characteristics while maintaining good performance, in particular concerning volumetric cooling capacity, heat transfer and, consequently, energy consumption. The temperature glide of the composition according to the invention is relatively small, thereby, when the compositions are used as refrigerant, the superheat at the end of the evaporation process can be significantly decreased and hence the evaporation temperature lifted. Furthermore the small temperature glide allows for a higher medium temperature in the evaporator and a lower condensing temperature in the condenser. The pressure of the composition is generally slightly higher compared to R22 but the compositions can be safely used with refrigeration equipment designed for use with R22.

DETAILED DESCRIPTION OF THE INVENTION

The composition according to the invention preferably comprises or consists of
HFC-125: 78.5-79.5 wt. %
HFC-134a: 17.4-19.0 wt. %
R600: 2.5-2.9 wt. %.

More preferably the composition according to the invention comprises or consists of
HFC-125: 78.5-79.5 wt. %
HFC-134a: 17.75-18.75 wt. %
R600: about 2.75 wt. %.

A composition according to the invention, which comprises or consists of
HFC-125: about 79 wt. %
HFC-134a: about 18.25 wt. %
R600: about 2.75 wt. %.
is more particularly preferred. Herein after the composition according to the invention consisting of 79 wt. % HFC-125, 18.25 wt. % HFC-134a and 2.75 wt. % R600 will be also referred to as "Mix A".

The compositions according to the invention are generally non-flammable, especially when tested in accordance with ASHRAE Standard 34-2007. Non flammability is generally found both in liquid and vapor phases. Preferred compositions are non flammable both in liquid and vapor phases in case of worst case fractionation scenario, for example tested according to ASHRAE Standard 34-2007.

The compositions according to the invention have generally a vapor pressure measured at 55° C. equal or lower than about 25 bars absolute pressure. Often this pressure is in a range from 23 to 25 bars, preferably from 24 to 25 bars. It has been found that the compositions having this pressure have particular heat transfer efficiency.

The compositions according to the invention have generally a temperature glide, defined as the temperature difference between the bubble point and the dew point at the boiling temperature and corresponding boiling pressure of the composition, which is less than 4° C., often equal to or less than 3.5° C., preferably equal to or less than 3.0° C. The temperature glide is generally equal to or more than 0.5° C., often equal to or more than 1.0° C.

Table 1 here after gives the pressure temperature behavior and glide of Mix A. The pressure temperature behavior of R22 is given for reference.

TABLE 1

| pressure bar | Boiling point (R22, reference) ° C. | Bubble point (Mix A) ° C. | Dew point (Mix A) ° C. | Glide ° C. |
|---|---|---|---|---|
| 0.79 | −45.94 | −50 | −46.27 | 3.73 |
| 1.01 | −40.83 | −45 | −41.37 | 3.63 |
| 1.28 | −35.71 | −40 | −36.48 | 3.52 |
| 1.60 | −30.60 | −35 | −31.58 | 3.42 |
| 1.97 | −25.49 | −30 | −26.68 | 3.32 |
| 2.42 | −20.39 | −25 | −21.77 | 3.23 |
| 2.93 | −15.28 | −20 | −16.87 | 3.13 |
| 3.53 | −10.18 | −15 | −11.97 | 3.03 |
| 4.21 | −5.08 | −10 | −7.06 | 2.94 |
| 4.98 | 0.02 | −5 | −2.16 | 2.84 |
| 5.86 | 5.12 | 0 | 2.75 | 2.75 |

TABLE 1-continued

| pressure bar | Boiling point (R22, reference) ° C. | Bubble point (Mix A) ° C. | Dew point (Mix A) ° C. | Glide ° C. |
|---|---|---|---|---|
| 6.85 | 10.22 | 5 | 7.65 | 2.65 |
| 7.97 | 15.32 | 10 | 12.55 | 2.55 |
| 9.21 | 20.42 | 15 | 17.45 | 2.45 |
| 10.59 | 25.52 | 20 | 22.35 | 2.35 |
| 12.12 | 30.63 | 25 | 27.25 | 2.25 |
| 13.80 | 35.74 | 30 | 32.14 | 2.14 |
| 15.66 | 40.85 | 35 | 37.02 | 2.02 |
| 17.69 | 45.97 | 40 | 41.90 | 1.90 |
| 19.92 | 51.10 | 45 | 46.78 | 1.78 |
| 22.35 | 56.23 | 50 | 51.64 | 1.64 |
| 25.00 | 61.37 | 55 | 56.49 | 1.49 |
| 27.89 | 66.53 | 60 | 61.32 | 1.32 |
| 31.03 | 71.70 | 65 | 66.11 | 1.11 |
| 34.46 | 76.89 | 70 | 70.83 | 0.83 |

The compositions according to the invention may be combined for example, with additives or auxiliaries used in refrigeration such as in particular a lubricant. Suitable lubricants include in particular those which are suitable for use with HCFC-22. Examples of lubricants which can suitably be combined with the composition according to the invention are selected from mineral oil, for example napthtenic mineral oils alkylbenzene oils lubricants, and polyol ester oils or mixtures thereof.

When the composition according to the invention is combined with an additive, in particular a lubricant as described here before the weight ratio composition/additive is generally from equal to or greater than 99:1 to equal to or less than 80:20 (weight/weight) preferably from equal to or greater than 98.5:1.5 to equal to or less than 95:5 (weight/weight).

The invention relates also to the combination of the composition according to the invention with an additive as described here before.

The invention relates also to a refrigeration apparatus containing a composition according to the invention or a combination according to the invention. A preferred refrigeration apparatus according to the invention is designed for use with R22. The refrigeration apparatus according to the invention is preferably suitable for providing low-temperature refrigeration.

"Low temperature refrigeration" is understood to denote in particular cooling a body to be cooled to a temperature of from −45° C. to −20° C. The compositions according to the invention and the refrigeration apparatus according to the invention are particularly suitable for cooling a body to be cooled to a temperature of from −35° C. to −20° C.

The compositions according to the invention and the refrigeration apparatus according to the invention are also suitable for "normal refrigeration", understood to denote in particular cooling a body to be cooled to a temperature of from greater than −20° C. to +5° C.

In a particular embodiment, the refrigeration apparatus according to the invention has been used with R22 and R22 has been replaced by the composition according to the invention. In a particular aspect of the refrigeration apparatus according to this embodiment, a lubricant, in particular as described above was used with R22 and said lubricant has been at least partially kept in the apparatus for use with the composition according to the invention.

The invention relates also to the use of the composition according to the invention as refrigerant, such as a method for refrigeration which comprises utilizing any of the compositions according to the invention. The composition according to the invention is preferably used as replacement for R22, in particular as drop-in replacement for R22.

EXAMPLES

The examples here after are intended to illustrate the invention without however limiting it.

Example 1

Refrigeration with a Composition According to the Invention

In an apparatus working with simple refrigeration cycle containing Mix A, evaporation of the refrigerant composition is carried out at −30° C. and condensation is carried out at variable temperatures (30/35/40/45° C.). Superheat is 5K and subcooling is 2K. The compressor efficiency at the different temperatures is given in the table here after.

Example 2

(Comparison): Refrigeration with Prior Art Refrigerants

Following the same procedure as in example 1, the volumetric cooling capacity of R22, R417A and the composition HFC-125/HFC-134a/pentane 76.8/19.2/4.0 (% wt.) disclosed in WO-A-01/23493 (here after "Mix B") are determined at different temperatures.

The results of examples 1 and 2 are shown in Table 2. It is apparent that the composition according to the invention comes the closest to the volumetric cooling capacity of R22 and is superior to the prior art non-ozone depleting R22 replacements.

TABLE 2

| Refrigerant | T. evap. ° C. | T cond. ° C. | p evap. bar | Ratio p cond./p. evap | Isentropic compressor efficiency | COP | Qvol, kJ/m³ |
|---|---|---|---|---|---|---|---|
| R22 | −30 | 30 | 1.64 | 7.27 | 0.745 | 2.33 | 1165 |
|  | −30 | 35 | 1.64 | 8.26 | 0.734 | 2.06 | 1662 |
|  | −30 | 40 | 1.64 | 9.35 | 0.723 | 1.82 | 1072 |
|  | −30 | 45 | 1.64 | 10.55 | 0.71 | 1.61 | 1024 |
| Mix A | −30 | 30 | 1.71 | 8.03 | 0.737 | 1.93 | 979 |
|  | −30 | 35 | 1.71 | 9.11 | 0.725 | 1.66 | 907 |
|  | −30 | 40 | 1.71 | 10.3 | 0.713 | 1.42 | 832 |
|  | −30 | 45 | 1.71 | 11.6 | 0.699 | 1.21 | 756 |
| Mix B | −30 | 30 | 0.7 | 18.33 | 0.628 | 1.17 | 417 |
|  | −30 | 35 | 0.7 | 20.78 | 0.603 | 1 | 388 |

TABLE 2-continued

| Refrigerant | T. evap. °C. | T cond. °C. | p evap. bar | Ratio p cond./p. evap | Isentropic compressor efficiency | COP | Qvol, kJ/m³ |
|---|---|---|---|---|---|---|---|
|  | −30 | 40 | 0.7 | 23.46 | 0.575 | 0.84 | 359 |
|  | −30 | 45 | 0.7 | 26.38 | 0.544 | 0.71 | 330 |
| R417A | −30 | 30 | 1.23 | 9.17 | 0.725 | 1.96 | 783 |
|  | −30 | 35 | 1.23 | 10.44 | 0.711 | 1.7 | 734 |
|  | −30 | 40 | 1.23 | 11.83 | 0.697 | 1.47 | 685 |
|  | −30 | 45 | 1.23 | 13.36 | 0.681 | 1.27 | 634 |

T. evap. Evaporation Temperature
T cond. Condensation Temperature
p evap. Evaporation pressure
p cond. Condensing pressure
COP Coefficient of Performance
Qvol. Volumetric Capacity Example 3

Flammability of a Composition According to the Invention

Mix A was determined to be non-flammable in accordance with ASHRAE Standard 34-2007.

Example 4

Worst Case Fractionation Scenario of a Composition According to the Invention

Concentration of refrigerant components after vapor leakage of Mix A with 90% liquid as worst case start condition is determined in accordance with ASHRAE Standard 34-2007. The maximum R600 content is reached after 93% vapor leakage with the evaporation of the last liquid. The full composition of vapor and liquid phases at this point is given in Table 3 the components being indicated in the same order as in the "Refrigerant" column. The maximum R600 concentration is in this point about 3.7 wt. % in the vapor phase and about 4.1 wt. % in the liquid phase. Both liquid and vapor phases are non-flammable.

Example 5

(Comparison)

As in example 4, concentration of refrigerant components after vapor leakage, but of refrigerant mix B, with 90% liquid as worst case start condition is determined. The maximum Pentane content is reached at the end of the liquid phase. The full composition of vapor and liquid phases at this point is given in Table 3 the components being indicated in the same order as in the "Refrigerant" column. The maximum Pentane concentration is in this point about 96.3 wt % in the liquid phase and 52.6 wt. % in the vapor phase. Both liquid and vapor phases are highly flammable.

Example 6

(Comparison)

As in example 4, concentration of refrigerant components after vapor leakage, but of a R125/R134a/n-butane blend with 75.02/21.48/3.5 with 90% liquid as worst case start condition is determined. The maximum n-butane content is reached at the end of the liquid phase. The full composition of vapor and liquid phases at this point is given in Table 3 the components being indicated in the same order as in the "Refrigerant" column. The maximum butane concentration is in this point about 5.37 wt. % in the liquid phase and 5.05 wt. % in the vapor phase. Both liquid and vapor phases are flammable.

TABLE 3

| Refrigerant | Amount of leaked Gas, % | Liquid (wt. %) | Vapor phase |
|---|---|---|---|
| R125/R134a/n-Butane (79.0/18.25/2.75 wt. %) (invention) (Mix A) | 93% | 50.3/45.6/4.1 | 63.3/33.0/3.7 |
| R125/R134a/Pentane (76.8/19.2/4.0 wt %) (comparison) (Mix B) | 98% | 1.0/2.7/96.3 | 18.9/28.5/52.6 |
| R125/R134a/Pentane (76.8/19.2/4.0 wt %) (comparison) (Mix B) | 91.5% | 14.2/8.4/77.4 | 64.0/22.2/13.85 |
| R125/R134a/n-Butane (75.02/21.48/3.5 wt. %) (comparison) | 95.54% | 38.33/56.30/5.37 | 51.82/43.14/5.05 |

Example 7

Drop-in Substitution of R22 by the Composition According to the Invention

A cooling system for the food storage room and display cases of a company restaurant operated to cool the room to about 0° C. and the display cases to about −5° C. was monitored when working with R22. Over a given time period the compressor was either in working state, when the room and display cases needed to be cooled or in stand-by, when they were at an acceptable temperature. The percentage of compressor working time required to cool the room and display cases was taken as a benchmark for the efficiency of R22 in the cooling system. Subsequently, a drop-in substitution of the R22 by Mix A according to the invention was carried out. The compressor working time was monitored as described here before for R22, under similar conditions and for a similar period of time. The comparison of the percentages of compressor working time required with Mix A and with R22 respectively showed that Mix A was as efficient as R22.

The invention claimed is:

1. A composition which is non-flammable and which comprises
more than 75 to less than 80 wt. % of pentafluoroethane (HFC-125);
more than 17 to less than 22.7 wt. % of 1,1,1,2-tetrafluoroethane (HFC-134a); and
more than 2.3 to less than 3.0 wt. % of n-butane (R600).

2. The composition of claim 1, which comprises
78.5-79.5 wt. % of HFC-125;
17.4-19.0 wt. % of HFC-134a; and
2.5-2.9 wt. % of R600.

3. The composition of claim 2, which comprises
78.5-79.5 wt. % of HFC-125;
17.75-18.75 wt. % of HFC-134a; and
about 2.75 wt. % of R600.

4. The composition of claim 3, which comprises
about 79 wt. % of HFC-125;
about 18.25 wt. % of HFC-134a; and
about 2.75 wt. % of R600.

5. The composition according to claim 1, which has a vapor pressure measured at 55° C. below 25 bars.

6. The composition according to claim 1 which has a temperature glide from 0.5° C. to less than 4° C.

7. A combination comprising the composition according to claim 1 and a lubricant.

8. The combination according to claim 7, wherein the lubricant is selected from the group consisting of mineral oil and alkylbenzene oil.

9. The combination according to claim 7 wherein the weight ratio composition/lubricant is from 99:1 to 80:20 (weight/weight).

10. A refrigeration apparatus containing the composition according to claim 1.

11. The refrigeration apparatus according to claim 10, which is designed for use with R22.

12. The refrigeration apparatus according to claim 10, which is suitable for providing low-temperature refrigeration.

13. A method for refrigeration comprising utilizing the composition according to claim 1 as a refrigerant.

14. The method for refrigeration according to claim 13, wherein said composition is used as drop-in replacement for R22.

15. A refrigeration apparatus containing the combination according to claim 7.

16. A composition which is non-flammable and which consists of
more than 75 to less than 80 wt. % of pentafluoroethane (HFC-125);
more than 17 to less than 22.7 wt. % of 1,1,1,2-tetrafluoroethane (HFC-134a); and
more than 2.3 to less than 3.0 wt. % of n-butane (R600).

17. A combination comprising the composition according to claim 16 and a lubricant.

18. A refrigeration apparatus containing the composition according to claim 16, which is designed for use with R22.

19. A refrigeration apparatus containing the composition according to claim 16, which is suitable for providing low-temperature refrigeration.

* * * * *